US009697679B2

(12) United States Patent
Ho et al.

(10) Patent No.: US 9,697,679 B2
(45) Date of Patent: Jul. 4, 2017

(54) GAMING MACHINE HAVING LIFTABLE MONITOR

(71) Applicant: ENTROPY PRECISION SYSTEM INC., Taipei (TW)

(72) Inventors: Shih-An Ho, Taipei (TW); Yun-Kun Chen, Taipei (TW); Wei-Chu Chen, Taipei (TW); Cheng-Chi Yu, Taipei (TW)

(73) Assignee: Entropy Precision System Inc., Taipei (TW)

( * ) Notice: Subject to any disclaimer, the term of this patent is extended or adjusted under 35 U.S.C. 154(b) by 33 days.

(21) Appl. No.: 14/966,732

(22) Filed: Dec. 11, 2015

(65) Prior Publication Data

US 2017/0061730 A1 Mar. 2, 2017

(30) Foreign Application Priority Data

Sep. 2, 2015 (TW) ............................ 104214236 A

(51) Int. Cl.
*A63F 13/00* (2014.01)
*G07F 17/32* (2006.01)

(52) U.S. Cl.
CPC ...... *G07F 17/3216* (2013.01); *G07F 17/3211* (2013.01)

(58) Field of Classification Search
None
See application file for complete search history.

(56) References Cited

U.S. PATENT DOCUMENTS 5,876,285 A * 3/1999 Salour ........................ G07F 9/06 194/350
6,402,270 B1 * 6/2002 Frank ...................... A47F 3/005 16/366
7,806,770 B2 * 10/2010 Taxon ..................... G07F 17/32 463/1
2006/0287112 A1 * 12/2006 Mallory .............. G07F 17/3216 463/46
2008/0113818 A1 * 5/2008 Beadell ................... A63F 13/08 463/46
2009/0124395 A1 * 5/2009 O'Keene ............. G07F 17/3216 463/46
2012/0153788 A1 * 6/2012 Rozestraten ......... A47B 81/061 312/310
2013/0023346 A1 * 1/2013 Greenberg .......... G07F 17/3202 463/46
2016/0335836 A1 * 11/2016 Castro ................ G07F 17/3286

* cited by examiner

*Primary Examiner* — Jason Yen
(74) *Attorney, Agent, or Firm* — Muncy, Geissler, Olds & Lowe, P.C.

(57) ABSTRACT

A gaming machine having a liftable monitor is provided, wherein the cabinet has a receiving space defined therein, and the cabinet is formed with at least one opening communicating with the receiving space; a display unit is mounted to the cabinet by a pivoting device for closing the opening. Each rotary shaft of the pivoting device respectively and pivotally connects to an interior of the cabinet and the display unit, and at least one supporting arm pivotally connects between the cabinet and the display unit, such that the display unit is movable supported and secured by the rotary shafts and the supporting arm to allow the display unit to be lifted and rotated relative to the cabinet for opening/closing the opening.

4 Claims, 6 Drawing Sheets

GAMING MACHINE HAVING LIFTABLE MONITOR

FIELD OF THE INVENTION

The present invention relates to a gaming machine having a liftable monitor, particularly a gaming machine permitting the display unit to be lifted and rotated for maintaining the facilities located in the interior of the cabinet.

BACKGROUND

With the flourishing development of the gaming industry, large-sized upright gaming machines already can provide abundant and various game contents by the installation of thin-type displays, such as liquid crystal displays. The configuration of conventional gaming machines essentially includes a cabinet and a vertically hinged door. The displays and a console disposed with buttons are integrated onto the door to allow users to play the game by inserting coins, banknotes or cards into the coin/banknote module through the acceptor located on the door. Therefore, when repairing or maintaining other devices or circuits in the interior of the cabinet, the door has to be opened outwardly in advance for permitting access to the internal components of the cabinet.

However, due to the design configuration of the vertically hinged door of the above-mentioned gaming machines, a considerable clearance space in front of the machines is required for opening the door, which resulting in the increment of space required for disposing gaming machines and the reduction of the amounts of gaming machines. Further, the doors of the above-mentioned gaming machines are normally very heavy and bulky and require a larger construction space for the maintenance while the door is opened, which causing the obstruction to the maintenance. Consequently, gaming machines have to be located at regular intervals with each other and can not be placed close to each other. These shortcomings would affect the commercially potential profit margins.

SUMMARY OF THE INVENTION

In view of foregoing, after hard research and development, a gaming machine having a liftable monitor is provided by the present invention in order to solve the shortcomings described above, in so doing provides a gaming machine with its display unit capable of being lifted and rotated to facilitate the maintenance in the interior of the cabinet.

The primary object of the present invention is to provide a gaming machine having a liftable monitor, wherein the display unit is mounted to the opening located in the front side of the cabinet by a pivoting device, thereby rapidly carrying out the maintenance operation to the interior of the cabinet while the display unit is lifted and rotated.

Another object of the present invention is to provide a gaming machine having a liftable monitor, wherein a curve-shaped rotary shaft is pivotally connected to the interior sidewall of the cabinet and the display unit to allow the display unit to rotate along a nonlinear path, so as to receive at least part of the upper portion of the display unit between the two ends of the rotary shaft to permit the most part of the display unit to be received in the cabinet, thereby facilitating the maintenance operation in the interior of the cabinet.

In order to achieve the aforementioned objects, the gaming machine having a liftable monitor of the present invention comprises a cabinet and at least one display unit, wherein the cabinet has a receiving space defined therein, and the cabinet is formed with at least one opening communicating with the receiving space; the at least one display unit is mounted to the cabinet by a pivoting device for closing the opening, wherein the pivoting device comprises two rotary shafts respectively and pivotally connected to an interior of the cabinet and the display unit, and at least one supporting arm pivotally connected between the cabinet and the display unit, such that the display unit is movable supported and secured by the rotary shafts and the supporting arm to allow the display unit to be lifted and rotated relative to the cabinet for opening/closing the opening.

In practice, the rotary shaft is formed in a curve shaped, and one end of the rotary shaft is pivotally disposed at a back side of the display unit proximate to an upper portion of the display unit, and the other end of the rotary shaft is pivotally connected to the interior of the cabinet.

In practice, the rotary shafts and the supporting arm are adapted to allow at least part of the upper portion of the display unit is received between the two ends of each rotary shaft after the display unit is rotated.

In practice, the pivoting device further comprises an extensible supporting pivotally connected between the cabinet and the display unit.

In practice, the extensible supporting is a gas strut.

Other objects, advantages and novel features of the present invention will become more apparent from the following detailed description when taken in conjunction with the accompanying drawings.

DETAILED DESCRIPTION

Figure 1:
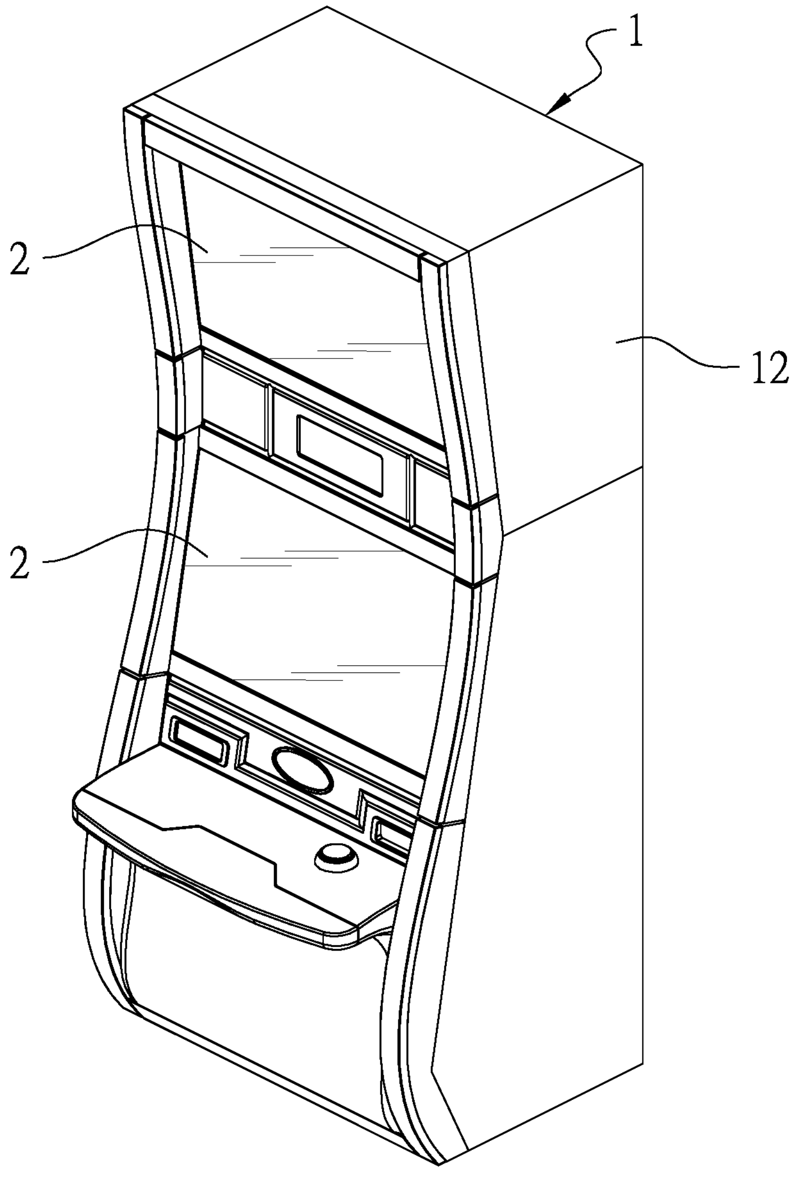
FIG. 1 is a perspective view of an embodiment showing a gaming machine having a liftable monitor according to the present invention.
Figure 2:
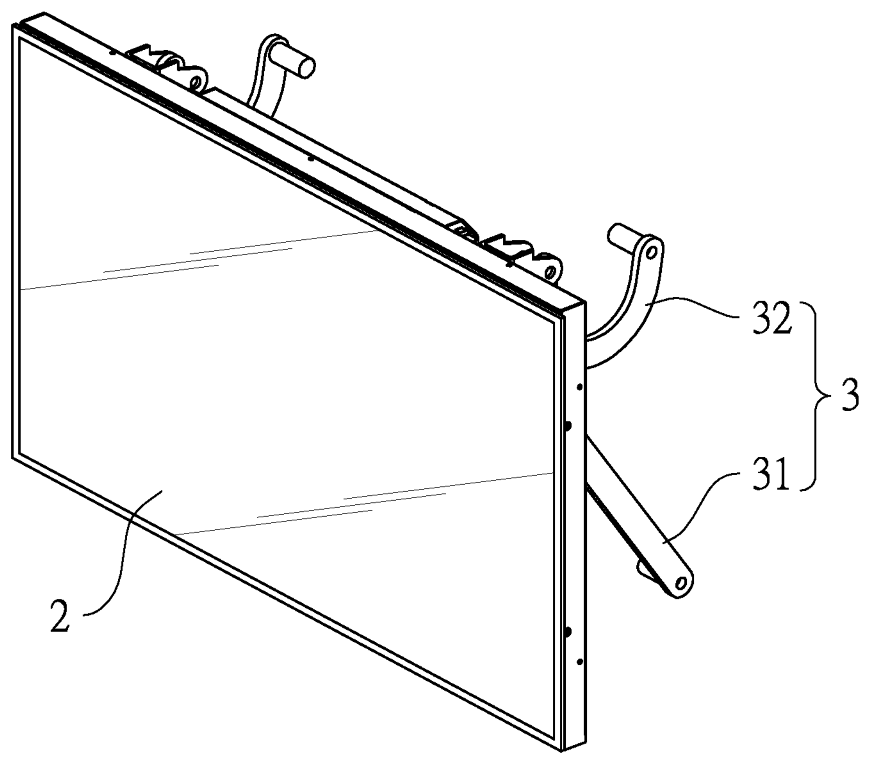
FIG. 2 is a perspective view of the embodiment of FIG. 1 showing the display unit combined with the rotary shafts and supporting arms.
Figure 3:
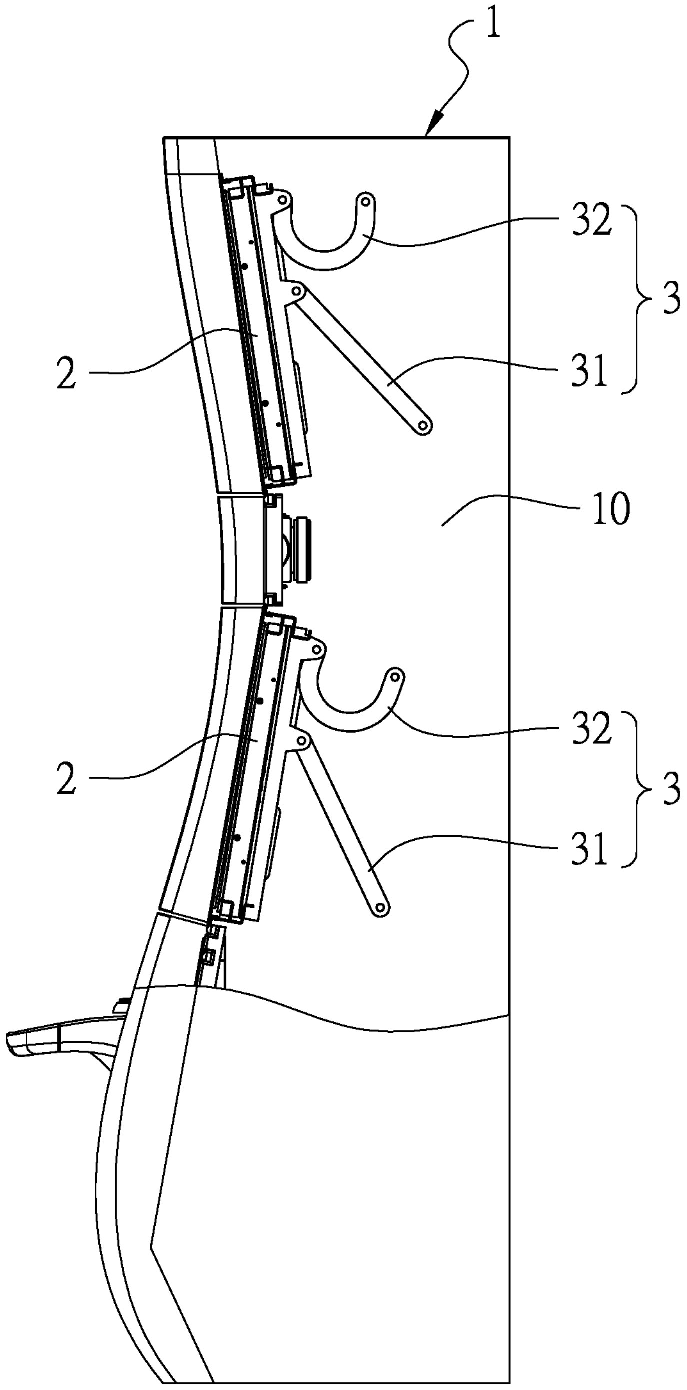
FIG. 3 is a cross-sectional side view of the embodiment of FIG. 1 showing the gaming machine before the display unit is lifted.
Figure 4:
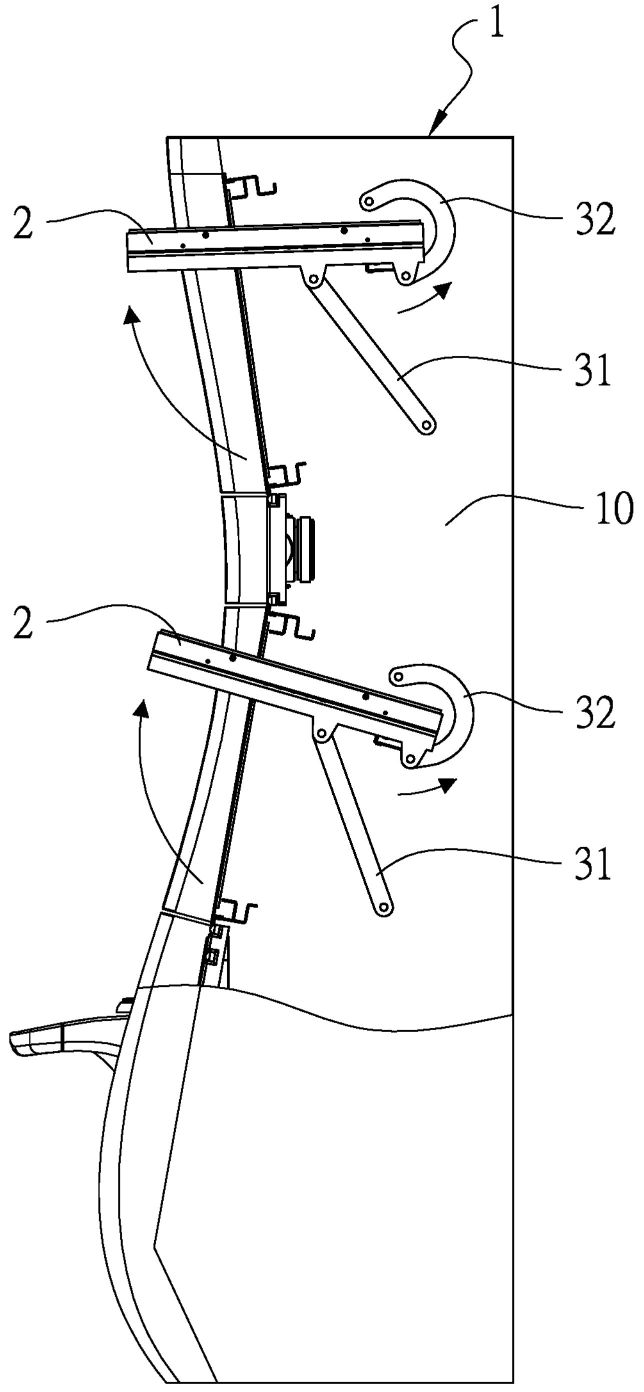
FIG. 4 is a cross-sectional side view of the embodiment of FIG. 1 showing the gaming machine after the display unit is lifted and rotated.
Figure 5:
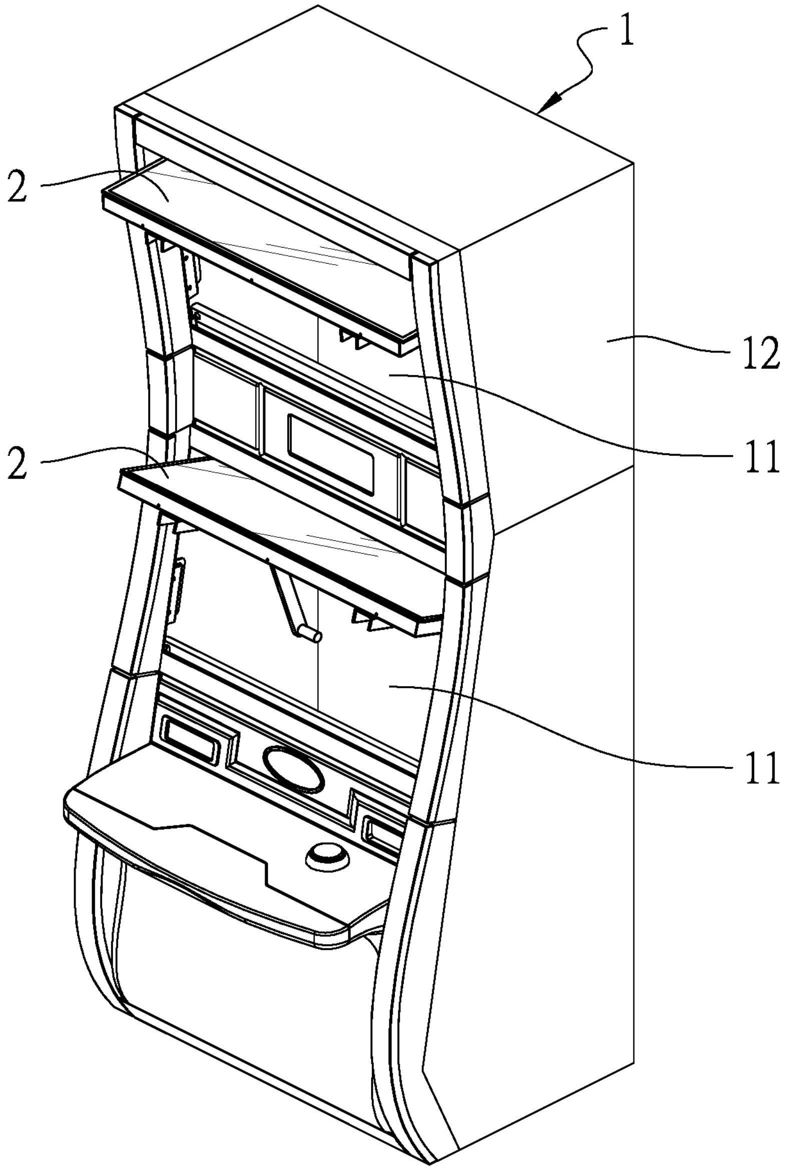
FIG. 5 is a perspective view of the embodiment of FIG. 1 showing the gaming machine after the display unit is lifted and rotated.

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

The use of "a" or an is employed to describe elements and " " components described herein. This is done merely for convenience and to give a general sense of the scope of the invention. This description should be read to include one or at least one and the singular also includes the plural, or vice versa, unless it is clear that it is meant otherwise.

Referring to FIGS. 1-5 which shows an embodiment of a gaming machine having a liftable monitor of the present invention, the gaming machine comprises a cabinet 1, two discrete display units (monitors) 2 and two pivoting devices 3, wherein a receiving space 10 is defined in an interior of the cabinet 1, and two openings 11 are formed in the front side of cabinet 1 and capable of communicating with the receiving space 10.

Each pivoting device 3 is disposed in the receiving space 10 within the cabinet 1 and comprises two supporting arms 31 and two rotary shafts 32 substantially formed in a U-shaped curve, wherein one end of the rotary shafts 32 is pivotally connected to left and right sidewalls 12 of the cabinet 1 respectively, and the other end of the rotary shafts 32 is pivotally disposed at a position on the back side of the display unit 2 that is proximate to an upper portion of the display unit 2 with the back side facing toward the interior of the cabinet 1. One end of the supporting arms 31 is pivotally connected to left and right sidewalls 12 of the cabinet 1 respectively, and the other end of the supporting arms 31 is pivotally disposed at a lower position of the back side of the display unit 2 that is slightly lower than the position of a pivot connection of the rotary shaft 32 respectively. Accordingly, the display units 2 could be mounted to one of the openings 11 in the front side of the cabinet 1 by one of the pivoting devices 3 to close the opening 11, such that the display units 2 are movable supported and secured by the rotary shafts 32 and the supporting arms 31 to allow the display units 2 to be lifted and rotated relative to the cabinet 1 for opening/closing the openings 11.

The position of pivot connections of the rotary shafts 32 and the supporting arms 31 are configured and adapted to allow the display unit 2 to be rotatably and movably supported by the rotary shafts 32 and supporting arms 31, so as to rotate the display unit 2 along an arc-shaped path while the display unit 2 is rotated forward and lifted upwardly, and receive a part of the upper portion of the display unit 2 between the two ends of each U-shaped rotary shaft 32 after the display unit 2 is completely lifted.

In practice, before beginning the maintenance of the interior components of the cabinet 1, the maintenance staff could rotate the display unit 2 upwardly by lifting the lower portion of the display unit 2 to make the upper portion of the display unit 2 move toward the interior of the cabinet 1, such that the most part of the display unit 2 is received in the cabinet 1 after the display unit 2 is completely lifted, thereby facilitating the maintenance operation in the interior of the cabinet.

Figure 6:
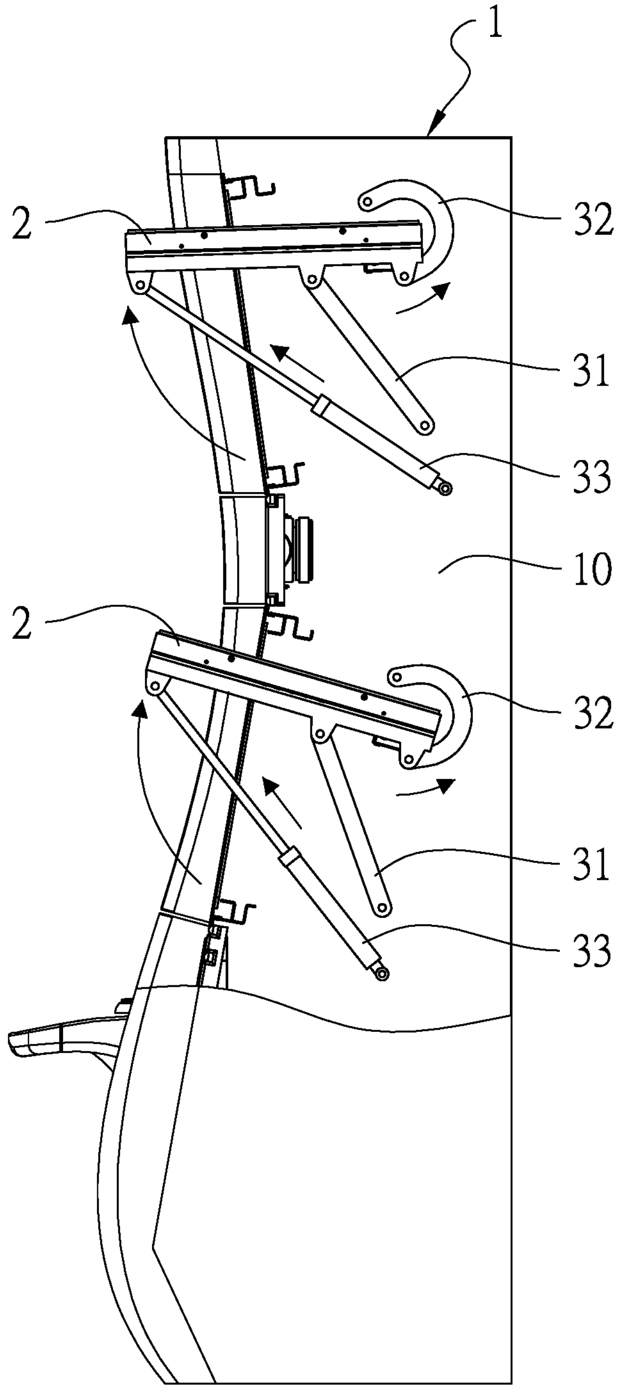
FIG. 6 is a cross-sectional side view of another embodiment of the present invention showing the gaming machine after the display unit is lifted and rotated.

Referring to FIG. 6 which shows another embodiment of a gaming machine having a liftable monitor on a basis of the abovementioned first embodiment of the present invention, each of the pivoting devices 3 further comprises an extensible supporting 33 (such as a gas strut) with its one end pivotally being connected to the sidewall 12 within the cabinet 1 while the other end of the extensible supporting 33 being pivotally disposed at a position on the back side of the display unit 2 that is proximate to the bottom of the display unit 2, thereby supporting the display unit 2 after the display unit 2 is completely lifted.

In other embodiments, the abovementioned rotary shaft could be formed into a curved shape (such as L shape) except the U shape on the basis of the position of the display unit.

Therefore, the present invention has the following advantages:

1. The pivoting device of the present invention could rotate the display unit while the display unit is lifted, so as to allow the most part of the display unit to be received in the cabinet after the display unit is completely lifted to prevent the display unit from falling down after it is lifted, increase the safety and reliability of the pivoting device, and greatly reduce the space occupied by a lifted display unit.

2. The present invention allows the maintenance staff to lift a specific display unit which is corresponding to the components required to be maintained (for example, a display unit in front of the component required to be maintained), thereby rapidly finishing maintenance work to raise the availability of the gaming machine.

3. The present invention could reduce the space required for the gaming machines to the minimum extent, such that more gaming machines could be placed on a gaming floor to increase the effectiveness of the floor and the practicality of the gaming machine.

As stated in the above disclosed, the present invention can surely achieve its expected objects to provide a gaming machine having a liftable monitor for rapidly maintaining the interior components of the cabinet by lifting and rotating the display unit.

It is to be understood that the figures and descriptions of the present invention have been simplified to illustrate elements that are relevant for a clear understanding of the present invention, while eliminating, for the purposes of clarity, many other elements which may be found in the present invention. Those of ordinary skill in the pertinent art will recognize that other elements are desirable and/or required in order to implement the present invention. However, because such elements are well known in the art, and because such elements do not facilitate a better understanding of the present invention, a discussion of such elements is not provided herein.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A gaming machine having a liftable monitor, comprising:

a cabinet having a receiving space defined therein, the cabinet being formed with at least one opening communicating with the receiving space;

at least one display unit mounted to the cabinet by a pivoting device for closing the opening, wherein the pivoting device comprises two rotary shafts respectively and pivotally connected to an interior of the cabinet and the display unit, and at least one supporting arm pivotally connected between the cabinet and the display unit, such that the display unit is movable supported and secured by the rotary shafts and the supporting arm to allow the display unit to be lifted and rotated relative to the cabinet for opening/closing the opening; and wherein the rotary shaft is formed in a curve shaped, and one end of the rotary shaft is pivotally disposed at a back side of the display unit proximate to an upper portion of the display unit, and the other end of the rotary shaft is pivotally connected to the interior of the cabinet.

2. The gaming machine of claim 1, wherein the cabinet is formed with two openings, and each opening is disposed with one display unit.

3. The gaming machine of claim 1, wherein the pivoting device further comprises an extensible supporting pivotally connected between the cabinet and the display unit.

4. The gaming machine of claim 1, wherein the extensible supporting is a gas strut.

* * * * *